United States Patent
Matsui et al.

(10) Patent No.: US 7,110,600 B1
(45) Date of Patent: Sep. 19, 2006

(54) DOCUMENT IDENTIFYING DEVICE AND METHOD

(75) Inventors: Takayuki Matsui, Kawasaki (JP);
Yutaka Katsumata, Kawasaki (JP);
Kazunori Yamamoto, Kawasaki (JP);
Shinichi Eguchi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/049,635

(22) PCT Filed: Sep. 30, 1999

(86) PCT No.: PCT/JP99/05398

§ 371 (c)(1),
(2), (4) Date: Feb. 25, 2002

(87) PCT Pub. No.: WO01/26024

PCT Pub. Date: Apr. 12, 2001

(51) Int. Cl.
*G06K 9/34* (2006.01)
*G06K 9/00* (2006.01)

(52) U.S. Cl. ............... 382/176; 382/136; 382/163; 382/164; 382/165

(58) Field of Classification Search ........... 382/137, 382/138, 163, 165, 164, 176, 225
See application file for complete search history.

(56) References Cited

U.S. PATENT DOCUMENTS

| | | | | |
|---|---|---|---|---|
| 4,731,859 A | * | 3/1988 | Holter et al. | 382/225 |
| 5,454,050 A | * | 9/1995 | Nakabayashi et al. | 382/165 |
| 5,459,797 A | * | 10/1995 | Sato | 382/165 |
| 5,579,407 A | * | 11/1996 | Murez | 382/164 |
| 5,799,115 A | | 8/1998 | Asano et al. | |
| 6,011,595 A | * | 1/2000 | Henderson et al. | 348/590 |
| 6,269,358 B1 | * | 7/2001 | Hirata | 707/1 |
| 6,625,313 B1 | * | 9/2003 | Morita et al. | 382/181 |
| 6,697,165 B1 | * | 2/2004 | Wakai et al. | 358/1.11 |

FOREIGN PATENT DOCUMENTS

| | | | |
|---|---|---|---|
| JP | 403160470 A | * | 7/1991 |
| JP | 3-220667 | | 9/1991 |
| JP | 10-124610 | | 5/1998 |
| JP | 11-47696 | | 2/1999 |
| WO | WO 97/41522 | * | 11/1997 |

* cited by examiner

*Primary Examiner*—Bhavesh M. Mehta
*Assistant Examiner*—Anthony Mackowey
(74) *Attorney, Agent, or Firm*—Arent Fox PLLC

(57) ABSTRACT

The invention relates to a document discriminating apparatus and a discriminating method for use in processing documents at financial institutions. A characteristic portion inherent in an optional format is cut out from image data read from a document in the optional format. Color constituents of the cut out image data are analyzed, and a color constituent exhibiting characteristics is selected from the constituents, and a color separation parameter is set for the selected color constituent. Data information is prepared which is related to the image data cut out based upon the color separation parameter. On the other hand, data information is prepared from image data obtained by reading a document to be discriminated based on the color separation parameter. Then, the data information is compared for determination with the data information stored in the document discriminating dictionary unit, whereby the document is discriminated.

3 Claims, 12 Drawing Sheets

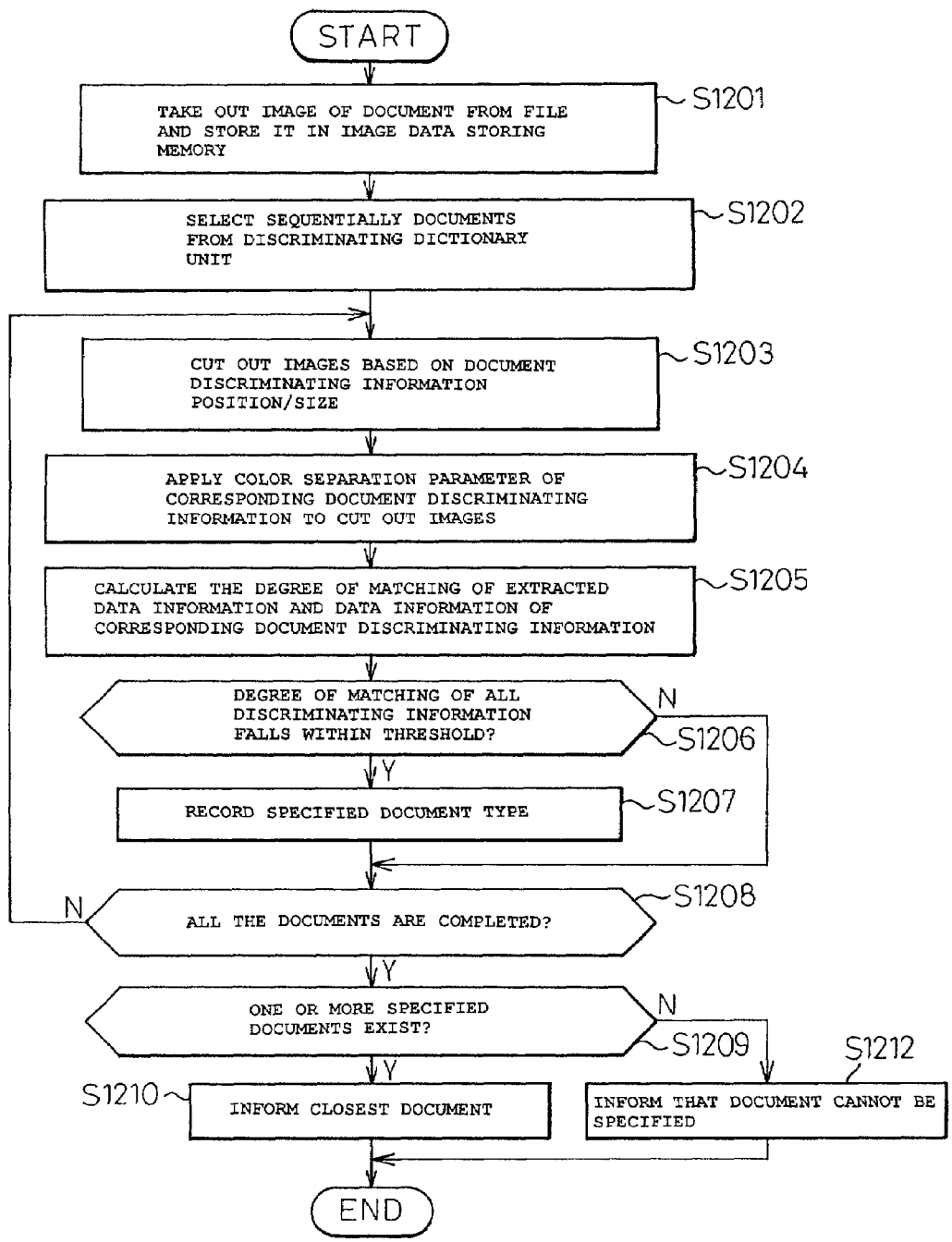

DOCUMENT IDENTIFYING DEVICE AND METHOD

CROSS-REFERENCE TO RELATED APPLICATIONS

This application is a continuation application and is based upon PCT/JP99/05398, filed on Sep. 30, 1999.

TECHNICAL FIELD

The present invention relates to a document discriminating apparatus, and a method for discriminating documents, which are suitable for use in processing documents at financial institutions and, more particularly, to an apparatus and method, for discriminating documents, for use in processing documents such as privately prepared slips in various formats.

BACKGROUND ART

In recent years, image data readers such as optical character readers (OCRs) have been developed as devices for reading character information as image data for character recognition, and image data readers are now widely used in various industries to attempt to perform jobs efficiently.

For example, operators at windows of financial institutions attempt to perform their jobs more efficiently by processing documents more efficiently using the image data readers.

In particular, in order to increase efficiency in performing jobs such as processing the documents, it is required not only to process a large number of documents of the same type but also to automatically process a large amount of documents of various formats.

To cope with this, document processing devices provided with an image data reader are used. The image data reader of the document processing device for reading image data on a document is adapted to read image data based on a control from an electronic computer. In addition, for example, image scanners and facsimile machines are used as the image data reader. Furthermore, the image data reader can be an image data read and recognition device which can both read image data and recognize characters.

In addition, the electronic computer functioning as a controller for controlling the image data reader is constituted by an input means which is a keyboard or a mouse for inputting instructions from the operator and data, a computer main body and a display for displaying data or control information. In addition, recognition of image data read by the image data reader is performed by the electronic computer main body.

Furthermore, the document processing device is provided with a hard disk, which is connected to the electronic computer and stores in advance position information of character data to be recognized for each type of document and information designating types and numbers of characters (hereinafter, referred to as "definition information").

Next, an operation will be described which is to be performed when the document processing device is used.

In recognizing character data described on, for example, an "ELECTRIC RATE BILL" using the image data reader, firstly, the operator operates the keyboard and designates definition information B corresponding to the type of a document (in this case, the document is regarded as an electric rate bill (Document B)).

Following this, at the electronic computer, the hard disk is accessed to draw the designated definition information B for the document, and the image data reader is notified of the information.

As this occurs, at the image data reader, reading of image data and recognition of characters can be performed, based on the definition information B which is a control information notified from the computer.

However, in a method for processing documents, as definition information is designated for each document to be read through the designation by the operator, the operator has to bear an additional work load, and there may occur designation errors with an increase in the number of pieces of definition information. Moreover, in a case where the operator is required to process thousands of types of documents, the designation by the operator is practically impossible.

To cope with this, there has been proposed a method for automatically reading documents without any designation by the operator, as described above, by describing in advance an specific ID number at a predetermined position on each type of document for discriminating the document of the type from others.

According to this method, in reading the image data of the document by the image data reader, the character recognition is made possible by firstly identifying the ID number put at the predetermined position and then using definition information (in this case, B) corresponding to the ID number.

However, in case the position on an optical reader portion of the image data reader where a document is set is changed in reading image data, for example, even in case document identical to the document whose definition information has already been stored in the hard disk, since a coordinate from the reference point (a physical origin) for an image such as a character data area and a graphic area does not match the coordinate in the definition information, it is determined that they are not in the same layout.

At the document processing device, there may be a case in which the character recognition process is not performed properly in case the character recognition of image data is implemented after the layout of the read image data has been made to match the layout of the definition information. Due to this, firstly, the reference points for the respective images are extracted, the coordinates of the respective images from the reference points are compared to each other, and whether or not the layouts match each other is determined.

Here, there are the following two methods for extracting a reference point for image data. As preconditions, a document to be read is a pre-printed document, and the printed position of the document on the form is controlled with high accuracy.

In a first method, in a case where image data of a document is read with an image data reader which can discriminate an end face of the document to be read from the background of the form to be read, for example, an upper left-hand side corner portion at the end face of the form is regarded as the reference point.

In addition, in a second method, in a case where image data of a document is read with an image scanner or a facsimile machine, since the read background cannot be discriminated from the end face of the form, a reference mark is printed in advance on a document form to be read, and this reference mark is extracted from the image data to become the reference point.

In this second method, since the reference point position is printed in advance as the reference mark, there is provided an advantage that even in case the position where a document is set on the reader is changed, the reference point can be extracted in a stable fashion.

However, in the document processing device, even in a case where the reference point is extracted accurately using the aforesaid method, since the character describing direction of image data does not become a correct direction in case the reading direction of image data is not the right direction, no character recognition process can be implemented.

For example, in case a money transfer request slip in which information is described horizontally is read from a wrong direction by the image data read and recognition device, the image data of the money transfer request slip so read is displayed on the display in the wrong direction.

Due to this, in recognizing characters by the document processing device, the operator determines whether or not the reading of the document is implemented from the right direction by looking at the display, and in case the reading direction of the document is determined to be wrong, the operator inputs from the keyboard a designation to rotate the image data of the document so read through 90 to 180 degrees, and a rotational correction process for the image data needs to be implemented so that the image data of the document can be displayed on the display in the right direction.

Incidentally, in executing jobs of transferring monies to accounts at banks, conventionally the operator inputs through the keyboard information on account number, names and amount of money which are described on a document which is a money transfer request slip, and as this occurs, the operator performs the input operation while watching the document and the display in an alternate fashion.

However, when the operator performs the input operation while watching the document and the display alternately, since the movement of the eyes occurs frequently, there exists a problem that the visibility is deteriorated and hence there may be caused an error in matching an item on the document with an item on the display.

To cope with this, there has been proposed a document processing device for reading a document with an image data read and recognition device and displaying the results of character recognition of the image data so read, as well as the image data itself on the display.

According to this document processing device, since information described on the document can be seen directly on the display, the movement of the eyes is reduced, whereby the occurrence of errors in matching between the character recognition results and the image data can be reduced when confirming and modifying the character recognition results.

On the other hand, in recent years, another method has become the main stream, in data processing jobs at financial institutions, in which a client-server system is used to do data processing collectively, at high speeds, at the server.

For example, it is proposed that clients, set at respective branches (sales points), and a server, set at a regional center of a financial institution, are connected via exclusive lines or public lines to form a client server system, so that document processing is implemented collectively by the server to thereby attempt to increase the efficiency of the document processing jobs.

In batch processing the documents by the server as described above, since the amount of data collected at the server becomes gigantic, it becomes impossible for the operator to do document processing at the server, and therefore, a system must be designed in which the server can automatically do document processing without the involvement of the operator.

To this end, the application of a document discriminating process using documents on which ID numbers are described to this client server system makes it possible for the server to automatically discriminate the types of documents and to read documents.

In addition, also at clients of this client server system, as has been described above, the results of character recognition of the image data read by the image data reader, as well as the image data itself can be displayed on the display, whereby the information described on the documents can be seen directly on the display, thus making it possible to reduce the occurrence of errors in matching the character recognition results and the image data when confirming and modifying the character recognition results.

However, in the aforesaid method for processing documents, only documents prepared exclusively for the document processing device can be read by the device, and general documents which have conventionally been in use cannot be used. Therefore, there exists a problem that special documents have to be prepared for use with such a document processing device.

Additionally, with the first reference point extracting method described above, while the print position of the document on the form needs to be controlled with high accuracy, in the case of a document printed with, for example, a word processor, papers are set manually, and the print position tends to vary every time printing is carried out, this causing the problem that using the upper left-hand side corner at the end face of the form as the reference point is not suitable for use with the word processor.

Furthermore, with the second reference point extracting method described above, the document to be read is the special document on which the reference mark is printed, this causing the problem that the reference point cannot be extracted with respect to general documents on which no reference mark is printed.

In addition, even with a method in which a special point on the front side of the document is used as the reference point, this method being adopted in the recognition technology used on document readers, there is also caused a problem that the method cannot function effectively if the layout of a document to be read cannot be identified to some extent.

Additionally, even in case a similar document as that which has been read is read again, there occurs a case in which an image which has been read does not match the image which was read before due to dust or a thin spot, and when this happens there may be a case where the same reference point cannot be extracted.

Furthermore, in order for the rotational correction processing to be automatically implemented at the server, the character recognition of the image data which is actually read is implemented, and whether the reading direction of the document is correct or not is determined by whether or not the character recognition is possible, this causing a problem that the increase in efficiency of the document processing job is remarkably reduced.

In addition, in the aforesaid method in which the character recognition results are confirmed and modified by displaying on the display the character recognition results, as well as the image data itself, since matching between the image data and the confirmation items is visually implemented, in case there are many items to be confirmed in the image data, there is also provided a problem that it is not possible to eliminate recognition errors in case where there are many items in the image data to be confirmed.

Furthermore, in a case where image data cannot be displayed on the display at one time, in order to refer to data disposed before, the display screen has to be scrolled down and, as this occurs by depressing a predetermined key with the finger the scroll operation, this results in a more complicated operation.

DISCLOSURE OF THE INVENTION

The present invention was made in view of these problems, and an object thereof is to provide a document discriminating apparatus for processing documents which are general documents that have been conventionally used and which have various types of formats like privately prepared documents, and a document discriminating method.

In addition, another object of the present invention is to implement at all times stably and automatically the extraction of a reference point on image data of a printed document even for a document printed on a normal type of paper with a word processor without using the conventional end face of the form and a reference mark.

A document discriminating apparatus according to the present invention, which can attain the objects, comprises an image reading means for reading image data from a document prepared in an optional format, an image data cutting out means for cutting out data corresponding to a designated special portion of the document from the image data read by the image reading means, a color constituent extracting means for analyzing the color constituents of the image data cut out by the cutting out means and setting a color separation parameter for the specific color constituent, and a color constituent separating means for producing data information for the specific portion from the image data cut out based on the color separation parameter from the color constituent extracting means.

Here, the color constituents are analyzed by the three primary colors of the color, and one of the three primary colors of the color is selected as the specific color constituent. The color separation parameter related to the color constituent of the specific color is determined based on the concentration distributions of the three primary colors of the color.

Then, the document is discriminated by cutting out image data corresponding to a plurality of designated specific locations from the read image data, preparing data information for the specific portion from the cut out image data based on the color separation parameters, and comparing the data information with the data information stored in the document discriminating dictionary unit.

Consequently, according to the document discriminating apparatus according to the present invention, since accurate data information can be prepared for the cut out image data when automatically discriminating the type of the document from which image data is read with the image data read and recognition device, even if there exist a plurality of documents to be read with the image reader in a mixed fashion, the operator can process the document without paying attention to the definition of each document to thereby attempt to increase the efficiency of the job. In addition, there is no need to describe an ID number for discriminating the document itself, whereby general documents can be used, thus making it possible to deal with the existing systems with ease.

BRIEF DESCRIPTION OF THE DRAWINGS

FIG. 12 is a flowchart for explaining the operation of the embodiment of the present invention when attention is paid to the activation of the document discriminating step of the document discriminating apparatus.

MODE FOR CARRYING OUT THE INVENTION

To clarify the effectiveness provided by the present invention, firstly, the construction of a document discriminating apparatus which constitutes the base of the present invention will be described.

Figure 1:
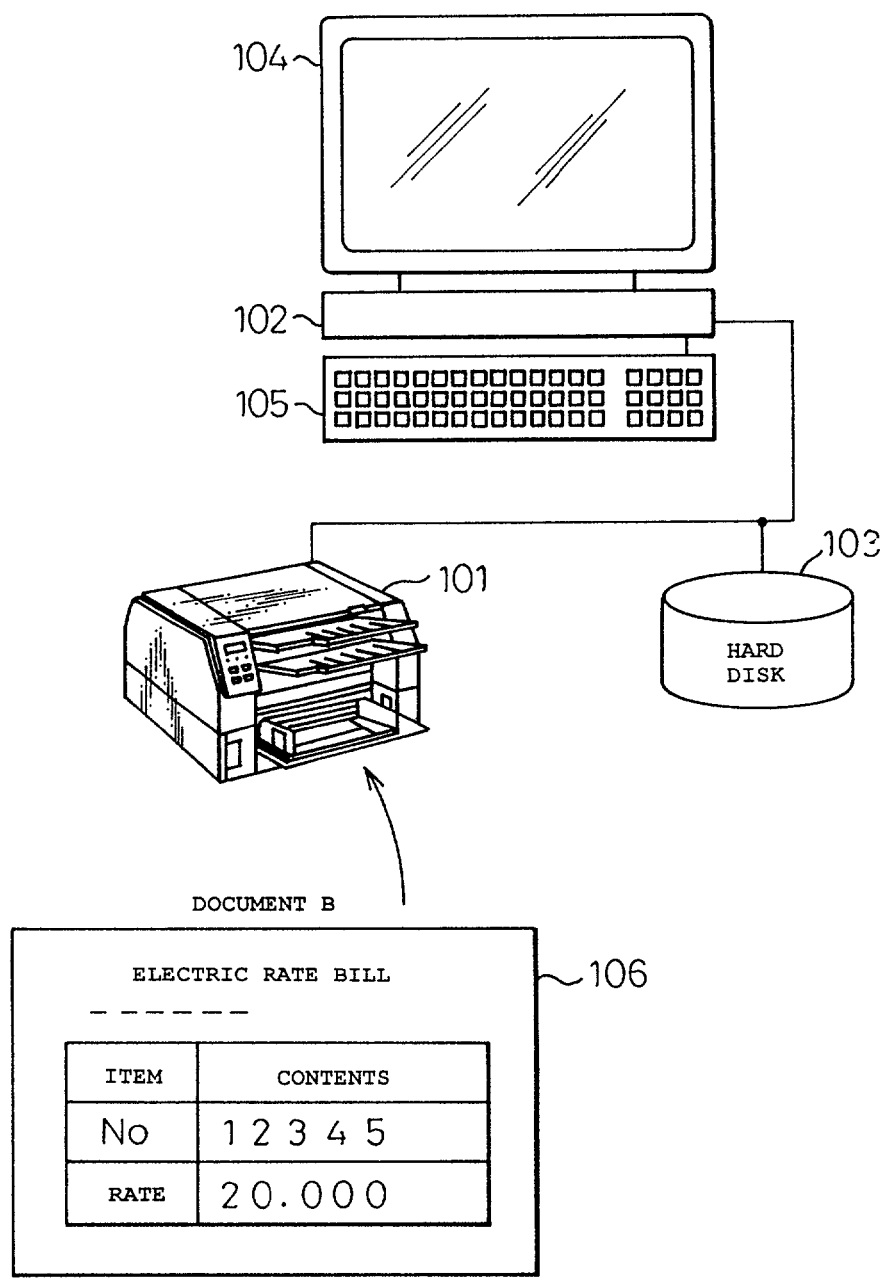
FIG. 1 is a typical diagram showing the construction of a document discriminating apparatus.

FIG. 1 is a functional block diagram showing the overall construction of a document discriminating apparatus. The document discriminating apparatus comprises an image data reader 101 for reading image data on a document, an electronic computer 101 for controlling the reading operation of image data, a hard disk 103 connected to the electronic computer 102 for storing in advance position information of character data to be recognized for each type of document and information designating the type and number of characters (hereinafter, referred to as "definition information"), a display 104 for displaying data and control information and an input means 105 such as a keyboard or a mouse for inputting instructions from an operator and data. Then, the image data reader 101 is adapted to read image data from a document 106 such as an "ELECTRIC RATE BILL." Note that the image data reader 101 includes for example an image scanner and a facsimile machine as an image data reading portion.

In the document discriminating apparatus constructed as described above, in order to deal with the aforesaid problems, there is proposed a document discriminating apparatus for processing documents which are general documents that have been conventionally used and which have various types of formats like privately prepared documents.

In addition, there is proposed a document discriminating apparatus adapted to implement at all times stably and automatically the extraction of a reference point on image data of a printed document even for a document printed on a normal type of paper with a word processor without using the conventional end face of the form and reference mark.

Then, referring to the appended drawings, the proposed document discriminating apparatus will be described below.

Figure 2:
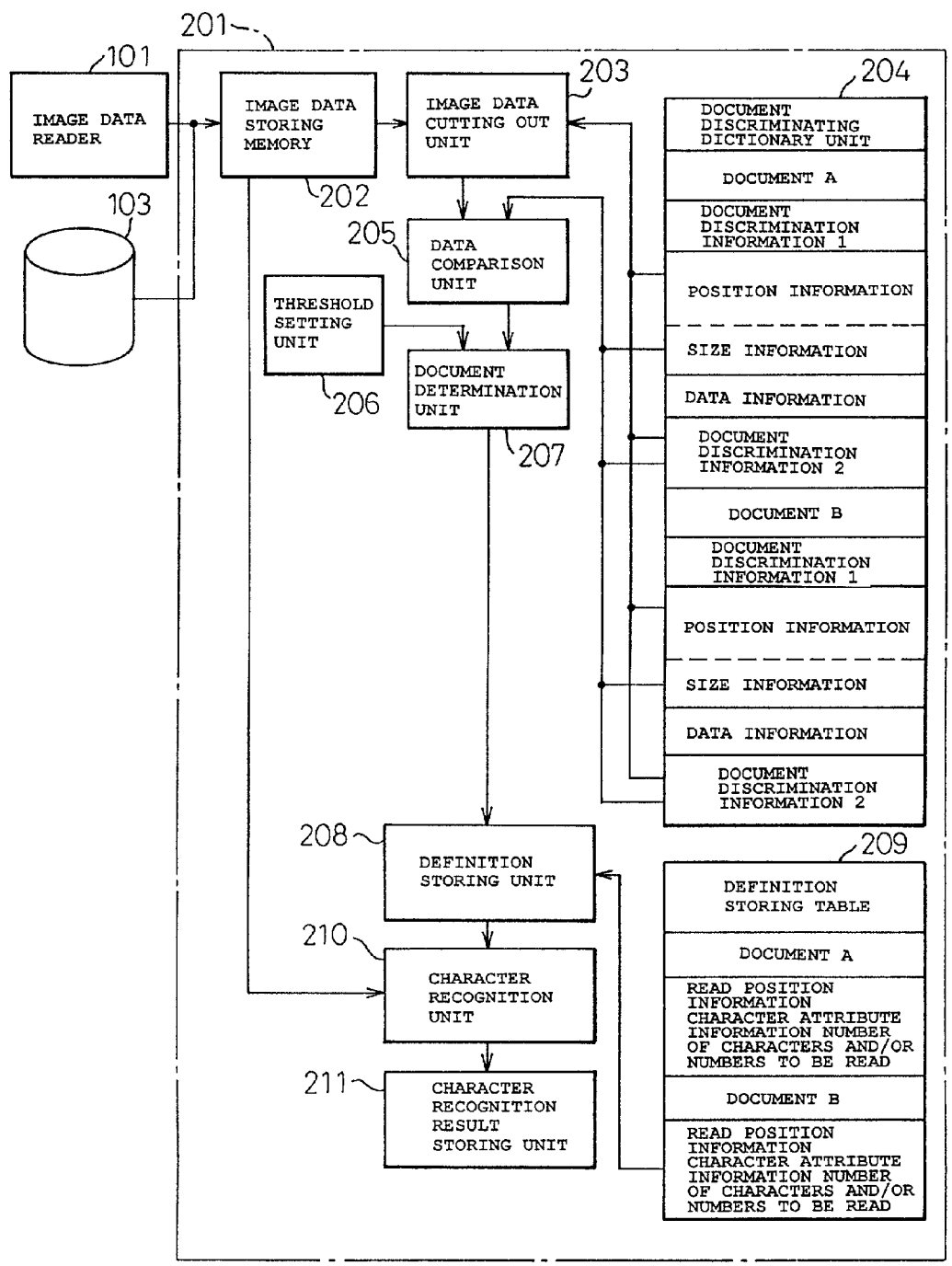
FIG. 2 is a block diagram showing a document discriminating apparatus which constitutes the base of the present invention.

FIG. 2 is a block diagram showing the document discriminating apparatus, and similarly, the document discriminating apparatus shown in FIG. 2 also comprises an image data reader 101, an electronic computer 102 (this electronic computer 102 comprising, as will be described, an input unit 105, a display 104 and a control unit 201) and a hard disk 103.

Here, the image data reader 101 is designed to read image data of a document and, as with the image data reader shown in FIG. 1, an optical character reader (an OCR) and an image scanner can be used as the image data reader.

In addition, the control unit 201 is designed to process the image data of a document read with the image data reader 101 as the document data based on the image data so read, and can be constituted by a CPU and a memory of the electronic computer 102.

Additionally, connected to this control unit 201 are the input unit 105 such as a keyboard or a mouse for inputting data or instructions from an operator thereinto and the display 104 for displaying thereon the image data read with the image data reader 101.

Furthermore, the hard disk (a file memory) 103 is designed to store the image data of all documents that are read with the image data reader 101.

Incidentally, as shown in FIG. 2, the control unit 201 comprises as functional blocks an image data storing memory 202, an image data cutting out unit 203, a document discriminating dictionary unit 204, a data comparison unit 205, a threshold setting unit 206, a document determination unit 207, a definition storing unit 208, a definition storing table 209, a character recognition unit 210 and a character recognition result storing unit 211.

The image data storing memory 202 is designed to temporarily store the image data of a document read with the image data reader 101. The image data cutting out unit 203 is designed to have a function as a document discriminating information extraction means for extracting required document discriminating information described on a document from the image data of the document stored in the image data storing memory 202 when receiving a designation of information (discriminating information) to be extracted through the operation of the input unit 105 by the operator.

Here, in the image data cutting out unit 203, in extracting required document discriminating information from the discriminating information, the image data of the document read with the image data reader 101 is designed to be displayed on the display 104, and the operator can designate discriminating information based on image graphics displayed on the display 104.

Note that the operator can designate every described information such as character information, marks, seals or rules described on a document as information (unique information) to be extracted at the image data cutting out unit 203. Then, coordinate position information for the designated information, size information of the described information and data information are designed to be automatically extracted as document discriminating information through, for example, software processing or firmware processing at the image data cutting out unit 203.

Furthermore, the document discriminating dictionary unit 204 is designed to register document discriminating information extracted at the image data cutting out unit 203 as document discriminating information for a specific document.

Figure 3:
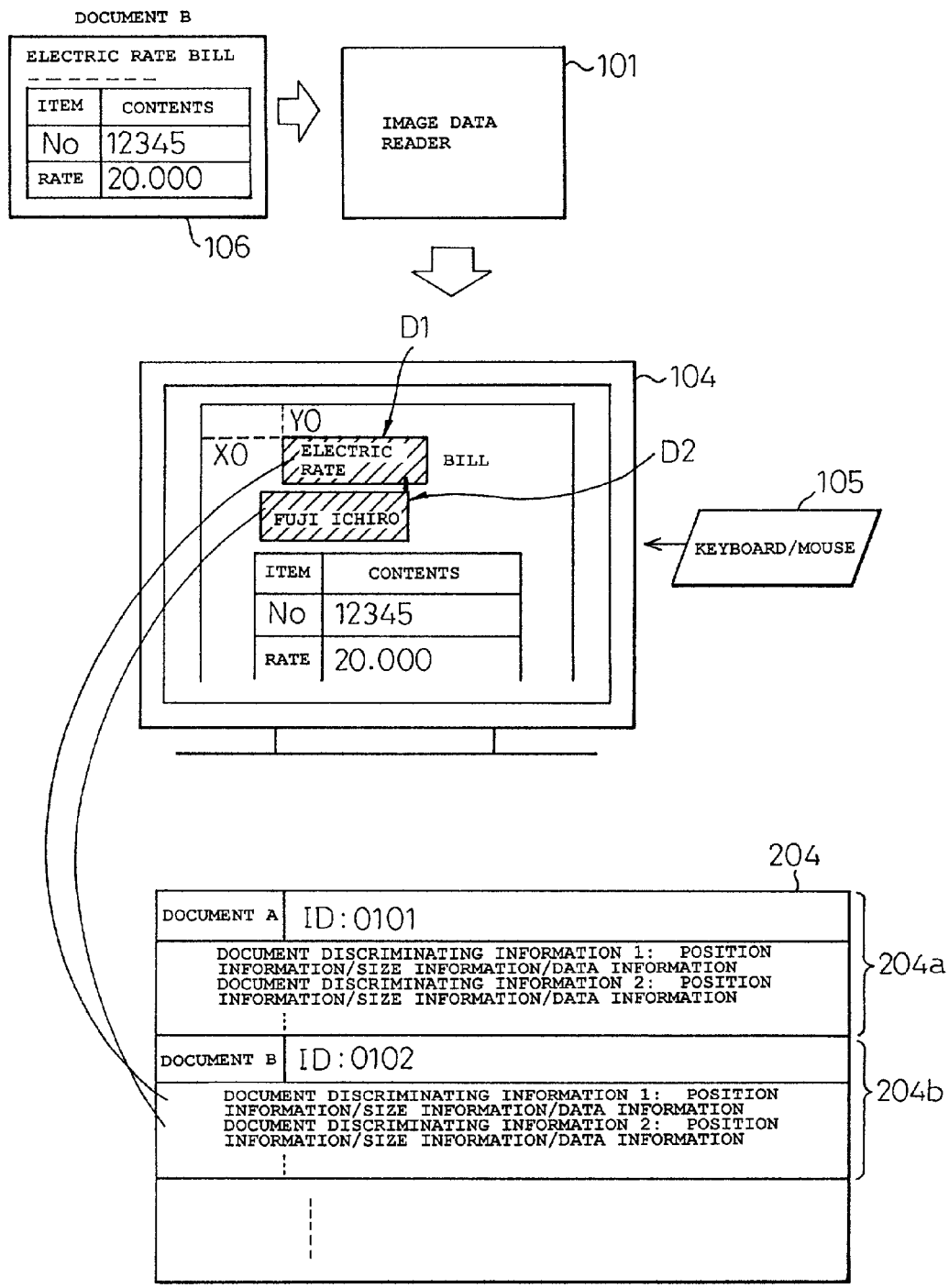
FIG. 3 is a diagram for explaining the operation of the document discriminating apparatus which constitutes the base of the present invention when a registration step is activated.

To be specific, as shown in FIG. 3, document discriminating information for a document type A having an ID number '0101' affixed thereto is designed to be stored in an area 204a, whereas document discriminating information for a document type B having an ID number '0102' affixed thereto is designed to be stored in an area 204b. Thus, like information is stored sequentially in accordance with ID numbers.

Here, an operation will be described below in which document discriminating information is registered as document discriminating information for a specific document. In FIG. 3, a state is shown in which the registration of the document type A has been completed, and a document type B of an "ELECTRIC RATE BILL" is about to be registered next. A document 106 which is the document type B read with the image data reader 101 is displayed on the display 104. The operator designates a plurality of locations which can be features to discriminate the document 106 (unique information) via the input means 105.

In the figure, a state is shown in which the 'electric rate' described on the document 106 is designated as unique information D1 and 'FUJI ICHIRO' as unique information D2. Position information $(X_0, Y_0)$ size information and data information such as characters are read with respect to the 'ELECTRIC RATE' and the pieces of information are stored in a document discriminating information 1 column of the area 204b which is a storing place for the document type B in the document discriminating dictionary unit 204 as a single piece of unique information. Then, as with the unique information D2, 'FUJI ICHIRO' the information is stored in a document discriminating information 2 column of the area 204b. Thus, the plurality of pieces of unique information on the feature portions required to specify a single document type are stored.

Consequently, an operation as a registration step is designed to be carried out by the image data storing memory 202, the image data cutting out unit 203 and the document discriminating dictionary unit 204 in which the document discriminating information described on the specific document is extracted from the image data of the specific document read with the image data reader 101 and the document discriminating information is registered in the document discriminating dictionary unit 204.

Note while the image data of the document read with the image data reader 101 is temporarily stored in the image data storing memory 202 when the document discriminating information is registered in the document discriminating dictionary unit 204, image data on the whole document is designed to be stored in the hard disk 103.

In addition, the data comparison unit 205 has a function as a verification means for verifying whether or not document discriminating information registered in the document discriminating dictionary unit 204 exists in the image data of a specific document read out from the image data storing memory 202. Furthermore, the data comparison unit 205 has also a function as a reference means for referring whether or not document discriminating information registered in the document discriminating dictionary unit 204 exists in the image data of an optional document read out with the image data reader 101 and stored in the image data storing memory 202.

Furthermore, the document determination unit 207 has a function as a determination means for determining whether or not a specific document has entirely been specified as a whole by determining whether or not the specific document can be recognized based on the results of the verification at the data comparison unit 205. Then, the document determination unit 207 also has a function as a document discriminating means for discriminating whether or not an optional document is the specific document based on the result of referring at the data comparison unit 205 functioning as the reference means.

Here, to be specific, the data comparison unit 205 calculates the degree of matching for image data inputted from the image data reader 101 by collating the information extracted at the image data cutting out unit 203 and corresponding document discriminating information from the document discriminating dictionary unit 204. Then, the document determination unit 207 functioning as the document discriminating means is designed to determine whether or not a document for the image data inputted from the image data reader 101 can be discriminated by comparing the degree of matching of the document discriminating information from the data comparison unit 205 with a threshold from the threshold setting unit 206.

Consequently, an operation as a verification step for determining whether or not the discrimination of a specific document can be implemented is performed by the document discriminating dictionary unit 204, the data comparison unit 205, the threshold setting unit 206 and the document determination unit 207.

In addition, in determination by the document determination unit 207 of the degree of matching based on the threshold information from the threshold setting unit 206, the threshold information from the threshold setting unit 206 is designed to be set such that a determination can be made by absorbing an error that would occur during the reading operation by the image data reader 101 and a printing error found on the document itself.

In addition, the definition storing unit 208 is designed to read out definition information for recognizing data described on the document from the definition storing table 209 to temporarily store the information therein. The storing of the information is implemented when a document read with the image data reader 101 can be recognized as the specific document that has already been registered at the document discriminating dictionary unit 204 by the document determination unit 207 when the system is operated.

The definition storing table 209 is designed to hold the definition information (for example, read position information, character attribute information, the number of characters or numbers to be read) for character recognizing the contents described on a specific document corresponding to the document discriminating information registered at the document discriminating dictionary unit 204.

In addition, the character recognition unit 210 is designed to character recognize the image data in accordance with the definition information when the definition information corresponding to the image data from the definition storing unit 208 is inputted thereinto with respect to the image data stored in the image data storing memory 202 as being related to the document which has been able to be recognized as the specific document that has been registered at the document discriminating dictionary unit 204.

Furthermore, the character recognition result storing unit 211 is designed to store character information recognized at the character recognition unit 210.

The operation of the document discriminating apparatus constructed as has been described heretofore will be described separately as in a registration step and in a document discriminating step.

[Processing in Registration Step]

First, the operation of the document discriminating apparatus in the registration step will be described below with reference to a control block diagram shown in FIG. 4 in which attention is paid to the activation of the registration step, a flowchart shown in FIG. 5 explaining the operation performed at the time of activation of the registration step and FIG. 3.

Namely, as shown in FIG. 3, when image data of a document 106 (for example, an electric rate bill) is read at the image data reader 101 through the operation of the operator (step S501), the image data so read is temporarily stored at the image data storing memory 202 (step S502), and this image data is also stored in the hard disk 103, whereby the whole image data read at the image data reader 101 is stored (step S503).

Note that as shown in FIG. 3, the image data read at the image data reader 101 is displayed via the display 104 (step S504).

Here, in case the image data stored in the image data storing memory 202 and the hard disk 103 is first image data on a document that has ever been read, the document discriminating information is stored in the document registration dictionary unit 204 as will be described below.

Namely, a plurality of pieces of unit information to be extracted are designated to the image data cutting out unit 203 when the operator operates the input unit 105 while referring to the display 104 (step S505).

At the image data cutting out unit 203, when the unique information described on the document is designated, position information, size information and data information related to the unique information are extracted automatically from the image data of the document stored in the image data storing memory 202 (step S506) and are then registered in the document discriminating dictionary unit 204 as the document discriminating information (step S507).

While the case shown in FIG. 3 has been described before, for example, by operating the input unit 105 the operator designates an electric rate showing the details of an amount of money to be paid which is described on the bill as first unique information D1 and 'FUJI ICHIRO' indicating the designation of a payer as second unique information D2. Then, the position information, size information and data information in the first information are stored whereas the position information, size information and data information in the second information are extracted at the image data cutting out unit 203. Furthermore, in case the operator designates a plurality of unique information, the information corresponding to the unique information is sequentially extracted at the image data cutting out unit.

As a result, the extracted document discriminating information for the document type B is stored in the area 204b of the document discriminating dictionary unit 204 as the document discriminating information of the document type B having the ID number '0102' affixed thereto.

Note that in this document discriminating apparatus, the image data cut out at the image data cutting out unit 203 is used only for discriminating the document.

In addition, in this document discriminating apparatus, it is ensured that the document can be discriminated in the verification step and the document discrimination step by registering the plurality of pieces of document discriminating information per single document without performing a normalization process of image data.

[Operation in Document Discrimination Step]

Next, the operation of the document discriminating apparatus according to the embodiment of the present invention in the document discriminating step will be described below with reference to a control block diagram shown in FIG. 6 in which attention is paid to the activation of the document discriminating step, and a flowchart shown in FIG. 7 explaining the operation performed at the time of activation of the document discriminating step.

In the verification step, whether or not the document can be specified using the document discriminating information registered at the document discriminating dictionary unit 204 can be verified with respect to the images of all the documents stored in the hard disk 103. When the verification is completed, when an actual document discrimination is implemented, an operation described below as a discrimination step for specifying the type of the document will be performed for the image data of an optional document.

Namely, when the image data of a certain document is read through the operation by the operator of the image data reader 101 (step S701), the image data so read is then temporarily stored in the image data storing memory 202 (step S702).

Next, at the image data cutting out unit 203, a plurality of pieces of image data (discriminating information) are extracted and cut out based on the position information and size information which constitute the document discriminating information in the document type sequentially selected from the document discriminating dictionary unit 204 for the image data temporarily stored in the image data storing memory 202 (steps S703, S704).

Following this, at the data comparison unit 205, a comparison determination is implemented by calculating the degree of matching between the data information of all the image data cut out at the image data cutting out unit 203 and the data information constituting the document discriminating information (step S705).

Furthermore, at the document determination unit 207, whether or not the image data read with the image data reader 101 can specify the type of the document with the document discriminating information from the document discriminating dictionary unit 204 by comparing the degree of matching calculated as the comparison determination result from the data comparison unit 205 with the determination standard of the degree of matching set at the threshold setting unit 206 (step S706).

In addition, in making a determination at the document determination unit 207, in case any of the plurality of pieces of image data cut out at the image data cutting out unit 203 does not match the document discriminating information from the document discriminating dictionary unit 204, it is determined as a different type of document.

To be specific, in step S706, for example, in a case where the image data of the first document type A is read from the image data reader 101, in case the document discriminating information sequentially read out from the document discriminating dictionary unit 204 to be compared with is related to the first document type A, it is determined as matched with respect to the document discriminating information (Y), and the read image data is specified as the matching document type. As this occurs, the specified document type is recorded in a memory, not shown, within the control unit 201 (step S707).

In addition, while the image data of the first document type A is read in from the image data reader 101, for example, in case the document discriminating information sequentially read out from the document discriminating dictionary unit 204 as an object for comparison is related to the second document type B, it is determined as unmatched (N). As this occurs, as the document type cannot be specified, there is no need to record the result, then the flow proceeds directly to step S708 by bypassing step S707. Then, in case the degree of matching has not been determined with respect to all the types of documents in the document discriminating dictionary unit 204 (N), then the flow returns to step S703, where the degree of matching is determined again using the document discriminating information related to other types of documents from the document discriminating dictionary unit 204.

Thereafter, as in the case with the aforesaid examples, the degree of matching of the document discriminating information is determined with respect to the image data read with the image data reader 101 based on the document discriminating information for each type of document stored in the document discriminating dictionary unit 204 (step S708).

Here, in case the image data read with the image data reader 101 can be specified as the single type of document in step S709 (Y), the specified type of document is then notified to the operator, and the type so specified is outputted to the definition storing unit 208 (step S710).

On the contrary, in case the image data cannot be specified as the single type of document (N), the operator is notified that the document cannot be specified by displaying, for example, a message to that effect on the display 104 (step S711).

In addition, at the definition storing unit 208, when the document type which is specified as the single type is inputted, the definition information (read position information, character attribute information, the number of characters and/or numbers to be read) corresponding to the specified type of document is read out from the definition storing table 211.

As a result, at the character recognition unit 210, this definition information and the character information described on the document whose image data is read with the image data reader 101 which is stored in the image data storing memory 202 are recognized and the character information as the result of recognition is stored in the character recognition result storing unit 211.

Consequently, in performing the discriminating step, the image data of an optional document is read with the image data reader 101, and whether or not the optional document is the specific document is discriminated by referring whether or not the document discriminating information registered in the document discriminating dictionary unit 204 exists in the image data of the optional document, whereby character recognition can be implemented.

Thus, the aforesaid document discriminating apparatus is constructed as comprising the image data reader 101, the image data storing memory 202, the hard disk 103, the image data cutting out unit 203, the document discriminating dictionary unit 204, the data comparison unit 205 and the document determination unit 207. According to the construction, in discriminating documents, the type of document whose image data is read with the image data reader 101 can automatically be discriminated. Then, even if there are a plurality of types of documents to be read with the image data reader 101 in a mixed fashion, the operator can process the documents without paying attention to the definition of each document, thereby making it possible to increase the efficiency of the document processing job. Furthermore, since no ID number for discriminating a document itself needs to be described, general types of documents can be used, and hence the document discriminating apparatus of the invention can be applied to an existing system without any difficulty.

In addition, when registering the document discriminating information to the document discriminating dictionary unit 204, since required document discriminating information can automatically be taken in through designation by the operator who can do it while looking at the image data of the documents to be registered which are displayed on the display 104, the preparation of the document discriminating dictionary can be facilitated, thus making it possible to attempt to increase the efficiency of the document processing job.

Additionally, the document discriminating information extracted when the operator designates the discriminating information can be designated at the plurality of locations and the document can be specified more accurately by designating the plurality of locations of the document than by designating a single location.

Thus, according to the proposed document discriminating apparatus, the discrimination can also be performed on documents of various types of formats such as privately prepared slips.

However, many of the private documents that have been in use in recent years are colored. A logo mark, which is one of features suitable for discriminating documents, is colored in many cases. In addition, documents of the same format are sometimes differently colored for different applications.

Of course, with the aforesaid document discriminating apparatus, document discriminating information can be obtained which designates the colored portion as a feature for discriminating the document. However, with the above document discriminating apparatus, in registering the plurality of pieces of document discriminating information on each document, even if the colored portion is designated, the discriminating information obtained from the designated colored portion is processed as a monochromatic information because the computer processes information in a binary fashion, and the monochromatic features of the document are then compared with each other. Due to this, the color information is substituted by monochromatic information, and therefore, the effectiveness of the colored features is deteriorated.

In addition, in a case where the background of a document is colored, the contrast is lowered and the extraction accuracy of the discriminating information is also lowered. Moreover, in the case of a color printed document, tones tend to be changed easily due to printing and/or reading errors, and blending also occurs. In addition, the colored document is also subjected to thin spots and blurs. Due to this, comparison of monochromatic images lowers the discriminating accuracy, and furthermore, even if digitized color images are simply compared with each other, the difference becomes larger and no accurate discrimination can be implemented.

Due to this, even if the color information has a feature in discriminating documents, the colored portion cannot be used as effective discriminating information. If the color information can be used in discriminating documents, it is clear that the discriminating capability can be improved extremely.

To cope with this, according to an embodiment of the present invention, there is provided a document discriminating apparatus which can discriminate documents stably and accurately even if there occurs a change in color through a construction in which data information for data discriminating information for use in discriminating documents can be extracted based on color information.

Next, referring to FIG. 8, a principle of extracting discriminating information based on color information according to the embodiment of the present invention will be described below.

In general, it is well known that a color comprises the three primary colors when it is separated into constituents. Also in the present invention, the principle of the three primary colors is adopted. However, for the sake of a simple description, in FIG. 8, only two color constituents are shown as a matter of conveniences.

Figure 8:
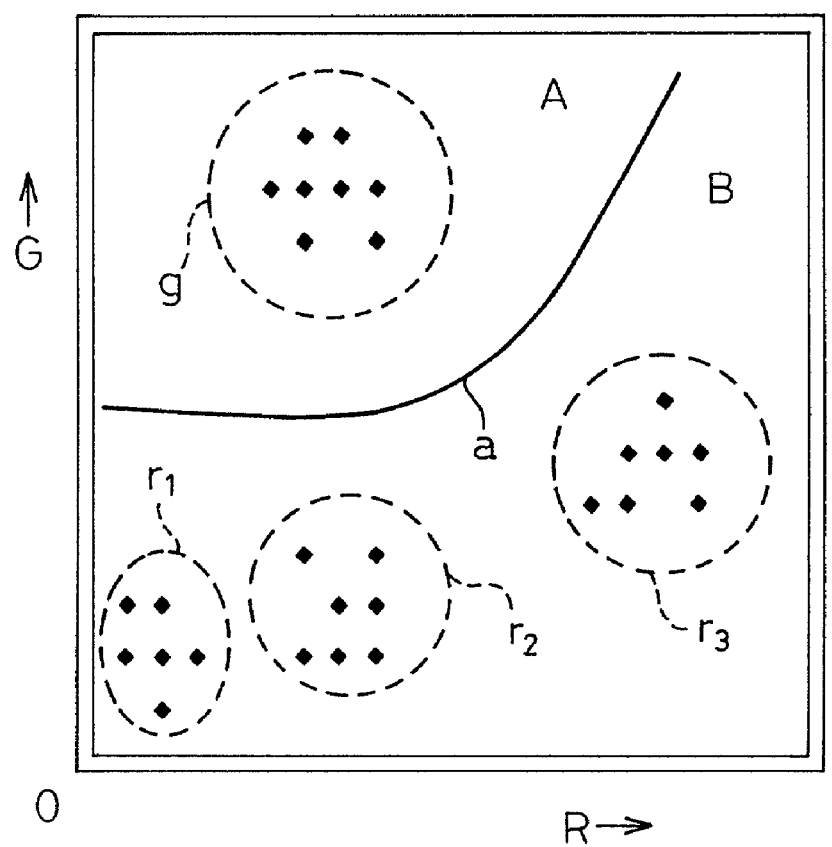
FIG. 8 is a diagram showing an example in which color constituent extraction and separation parameters are determined.

In FIG. 8, the axis of abscissa denotes, for example, a red constituent R and indicates that the density of the color increases as it goes farther in a direction indicated by an arrow R, whereas the axis of ordinate denotes a green constituent G and indicates that the density of the color increases as it goes upper in a direction indicated by an arrow G. In FIG. 8, while no blue constituent is shown, the blue constituent can be indicated in a direction normal to the surface of the paper on which FIG. 8 is illustrated. Therefore, the center 0 denotes white and indicates that as the density of the respective constituents increases, the color becomes closer to black. However, in the figure, the respective axes are shown on different scales.

As has been described with respect to FIG. 3, in registering a document, the document 106 is read with the image data reader 101, the image of the document is displayed on the display 104, feature portions of the document are designated with the input unit 105, and the document discriminating information is extracted. As this occurs, the results of reading with the image data reader 101 may be fully colored on the screen or only the result of reading of the extracted portion may be colored.

In FIG. 8, a state is shown in which, for example, the area of the 'ELECTRIC RATE' on the document type B is designated as an object for extraction, and the image data of the designated extracted portion is read. When analyzing the respective color constituents from the image data, they are represented as a plurality of dots in the figure. Since the object for extraction is a document, when analyzing the color constituents thereof, the result is a distribution of discontinuity. The figure illustrates a state in which the object for extraction is multi-colored.

In the density distribution for each constituent shown in FIG. 8, when looking at the green constituent G and the red constituent R, a group g of dots indicated by a broken line has a green constituent G which is remarkably denser than those in the other groups $r_1$, $r_2$ and $r_3$, whereby the group g can be discriminated from the other groups. Namely, the color constituents of the group g are closer to the color image of the extracted portion.

Then, in the present invention, the fact that the group g can be discriminated from the other groups $r_1$, $r_2$ and $r_3$ is used. For example, intermediate points between the group g and the other groups $r_1$, $r_2$ and $r_3$ are obtained, respectively, and a solid line a passing through these intermediate points is drawn. Here, assuming that this solid line a is a boundary, the whole area is divided into a green constituent G side which is an area A and a non-green constituent side which is an area B. This boundary is made to be a color separation parameter. When the green constituent G is analyzed from the extracted image data by setting the color separation parameter for the green constituent G, in case the green constituent exists in the area A, it is determined that the data exist, and it is adopted for discriminating information as data information equivalent to the monochromatic data. On the contrary to this, in case the green constituent exists in the area B, it is not adopted as discriminating information. Therefore, in order to use the color information for discrimination, the separated color constituents are designated, and the designated color constituents are then stored in the discriminating information dictionary area 204*b* as conditions for specifying the area A, or the boundary a is stored as the separation parameter in the discriminating information dictionary area 204*b*.

To this end, in comparing color images with each other, they cannot be discriminated from each other in case the colors coincide with each other completely. However, even if there occurs a printing or reading error, by designating the specific color constituent and setting the boundary a, in case the specific color constituent exists in the area A separated by the boundary a, since it is regarded as the discriminating information which is made to be monochromatic data, the feature of the extracted portion can sufficiently be specified, and the influence of variation in tone, thin spots or blur can be eliminated. Moreover, there exists no relationship with the background color on the data.

While the discrimination based on the color information has been described, the aforesaid extraction principle can be applied even to a monochromatic object for extraction. Namely, according to the principle of the three primary colors of color, white represents a state in which the three primary constituents of color do not exist at all, and on the contrary, black represents a state in which the three primary constituents exist to their maximum level. Then, in a case where the extracted portion is monochromatic, since it is clear that the results of color constituent extraction show that the density distributions of the three primary constituents are in the vicinity of their maximum values, respectively, in case any of the three primary constituents is selected and designated, data can be extracted as discriminating information.

Thus, even if the object for extraction contains color and monochromatic information in a mixed fashion, as is described above, it is ensured that discriminating information including monochromatic information can be obtained by setting the color separation parameter related to the designated color constituent.

Thus, while the extraction principle of color information has been described heretofore, the designation of color constituent and setting of the separation parameter are implemented while the results of the extraction of the extracted portion are indicated on the diagram shown in FIG. 8 which is indicated on the screen of the display 104. Then, extraction of color information does not have to be implemented on a new document, and as long as the information is good enough to be read with the image data reader 101, color information can be extracted on a used document and can be registered in the discriminating information.

Next, referring to FIGS. 9 to 12, a document discriminating apparatus will be described below which adopts the aforesaid color extraction principle according to the embodiment of the present invention.

While the basic construction of a control unit of the document discriminating apparatus according to the embodiment of the present invention is similar to the block construction shown in FIG. 2, the basic construction according to the embodiment differs from that shown in FIG. 2 in that the control unit further has a color constituent extracting unit and a color constituent separating unit for specifying the aforesaid color extraction principle and that the color separation parameter and the data information are additionally stored in the respective document discriminating information of the document discriminating dictionary unit.

While an input unit 105' is provided for color constituent extraction, the input unit 105 may be used for that purpose.

Then, the operation of the document discriminating apparatus according to the embodiment will be described below for a registration step and a document discriminating step individually.

[Process in Registration Step]

Figure 4:
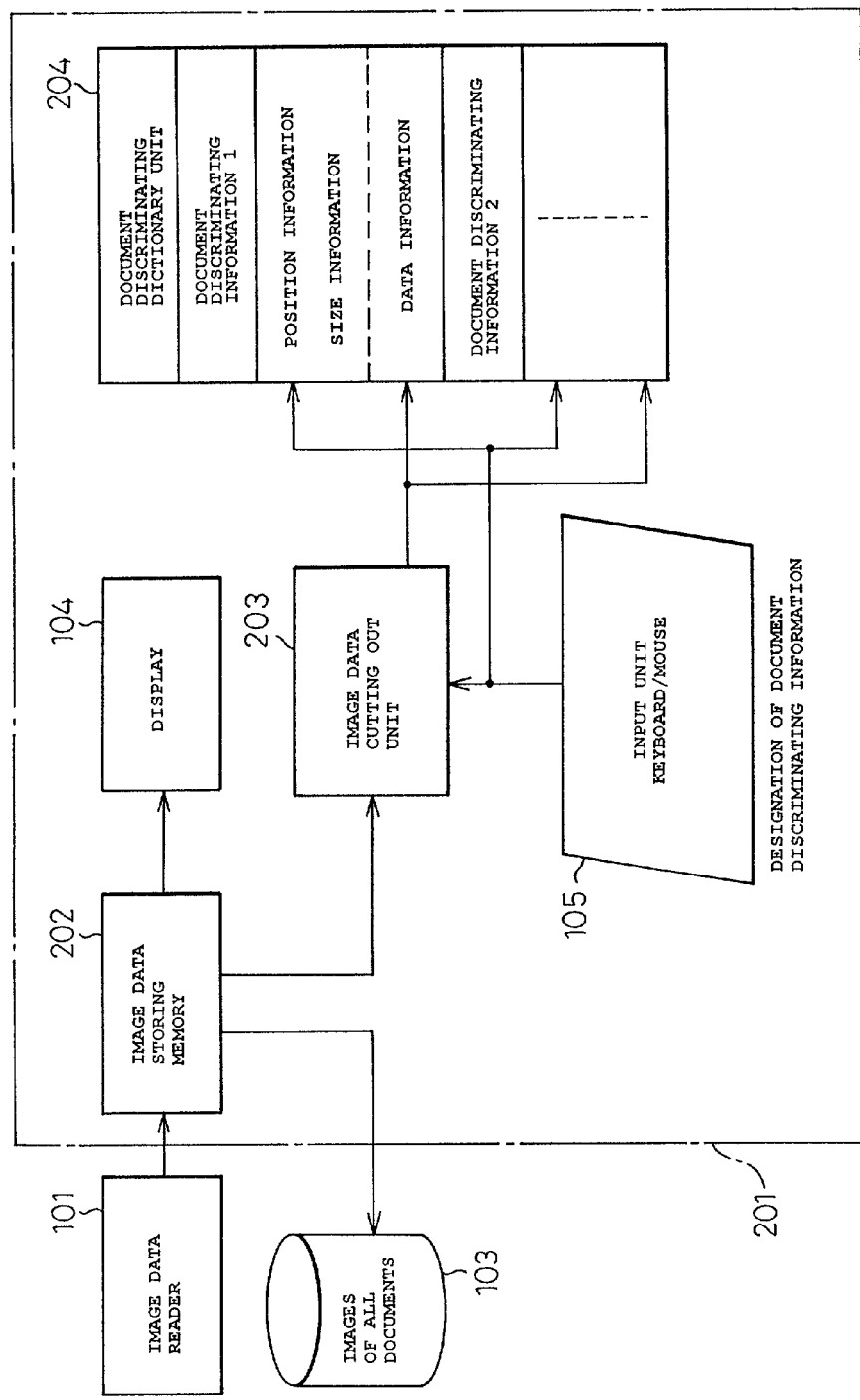
FIG. 4 is a control block diagram of the document discriminating apparatus which constitutes the base of the present invention when attention is paid to the activation of the registration step.
Figure 5:
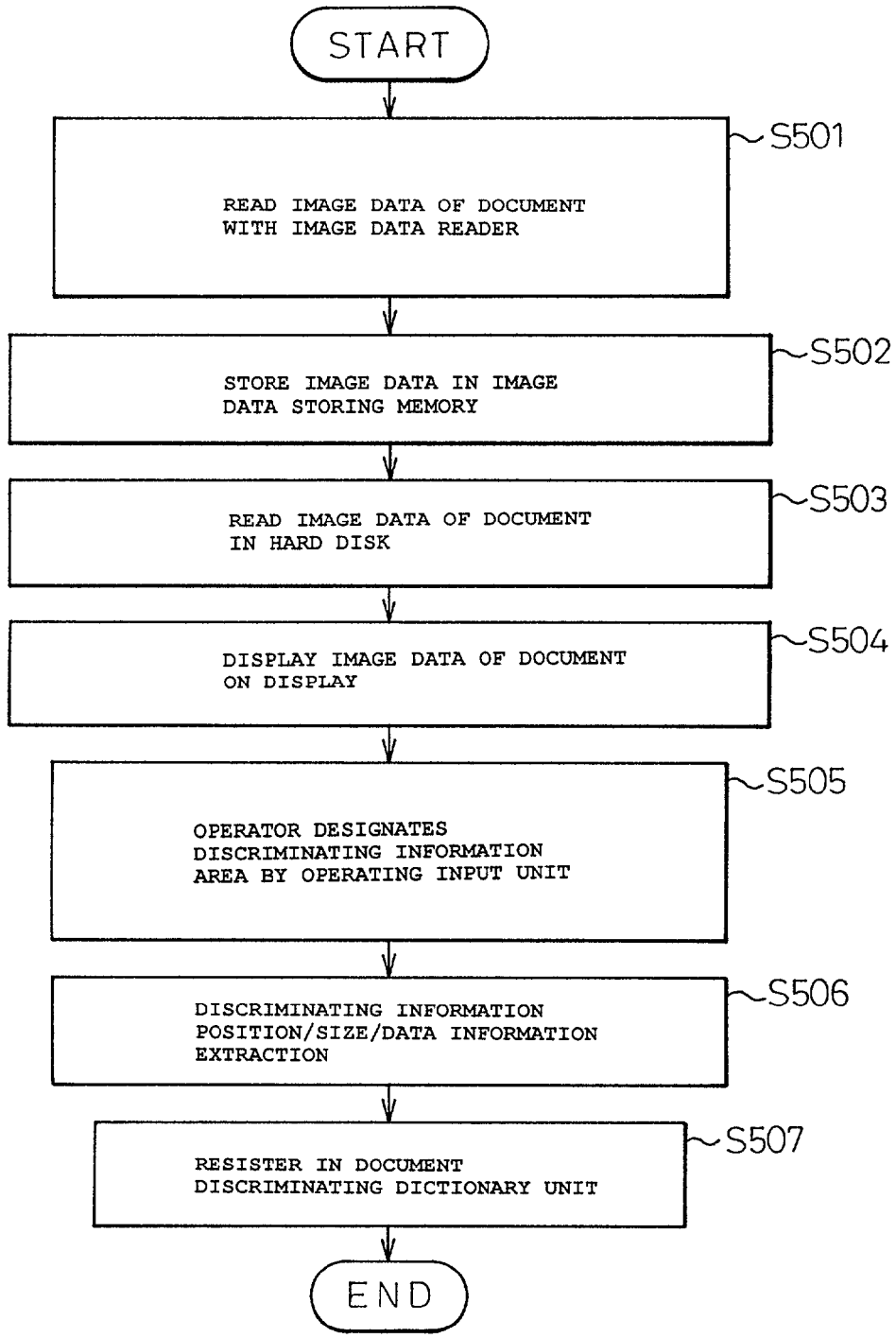
FIG. 5 is a flowchart for explaining the operation of the document discriminating apparatus which constitutes the base of the present invention when the registration step is performed.
Figure 9:
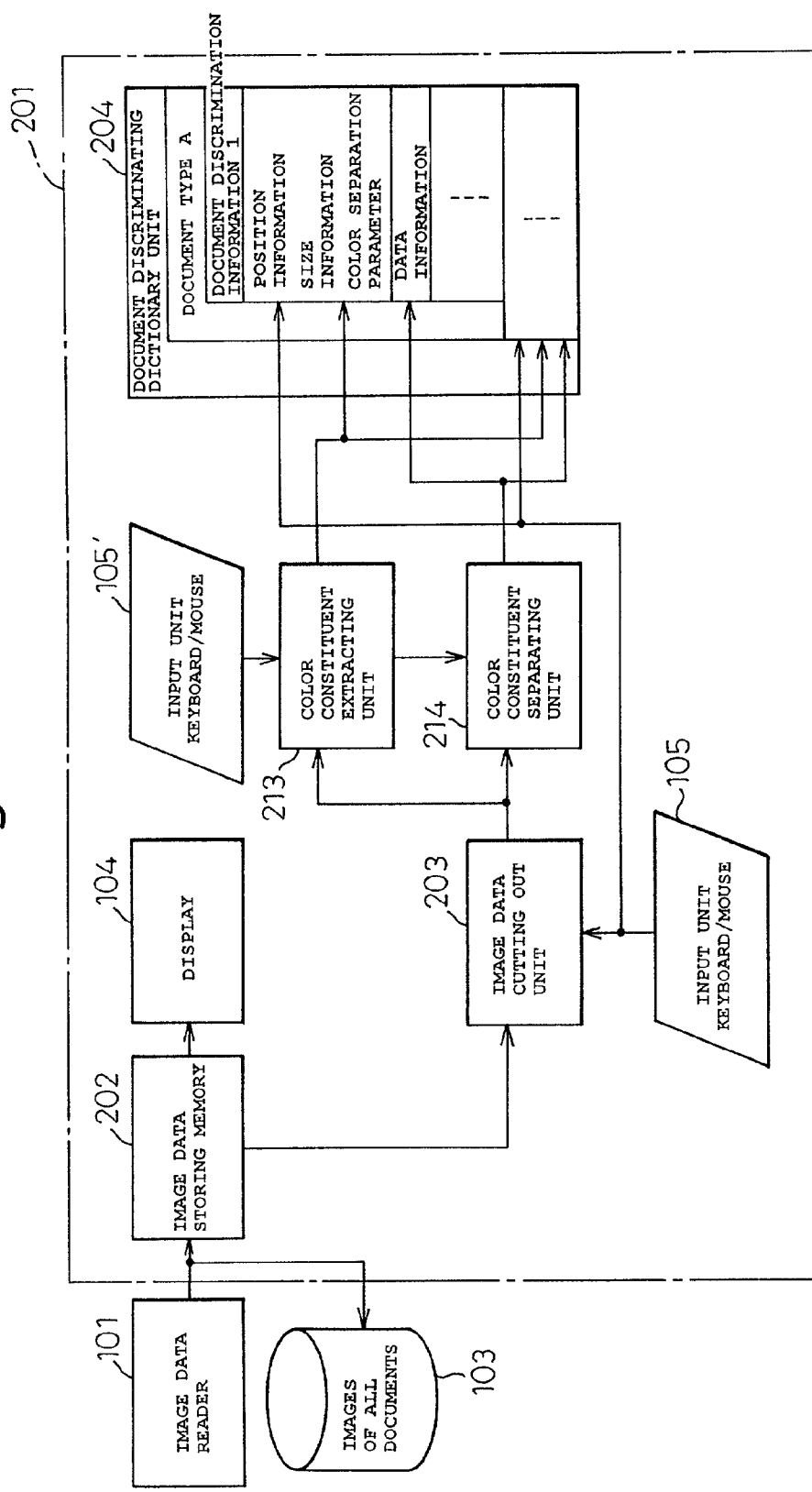
FIG. 9 is a control block diagram of an embodiment of the present invention when attention is paid to the activation of the registration step of the document discriminating apparatus.

Similarly to the control block diagram shown in FIG. 4, FIG. 9 shows the construction of a control block diagram when attention is paid in particular to the activation of the registration step in the document discriminating apparatus according to the present invention.

The control block shown in FIG. 9 in which attention is paid in particular to the activation of the registration step is constituted by an image storing memory 202, an image data cutting out unit 203, and a document discriminating dictionary unit 204. Then, the image storing memory 202 is designed to store data from the image reader 101 which is obtained when a document is read with the image reader 101. The control block of this embodiment is similar to the construction of the control block shown in FIG. 4 in that a hard disk 103 is connected thereto in which the data read from all documents is stored. However, the document discriminating apparatus according to the present invention is characterized further in that the color extracting unit and the color constituent separating unit are additionally provided.

Figure 10:
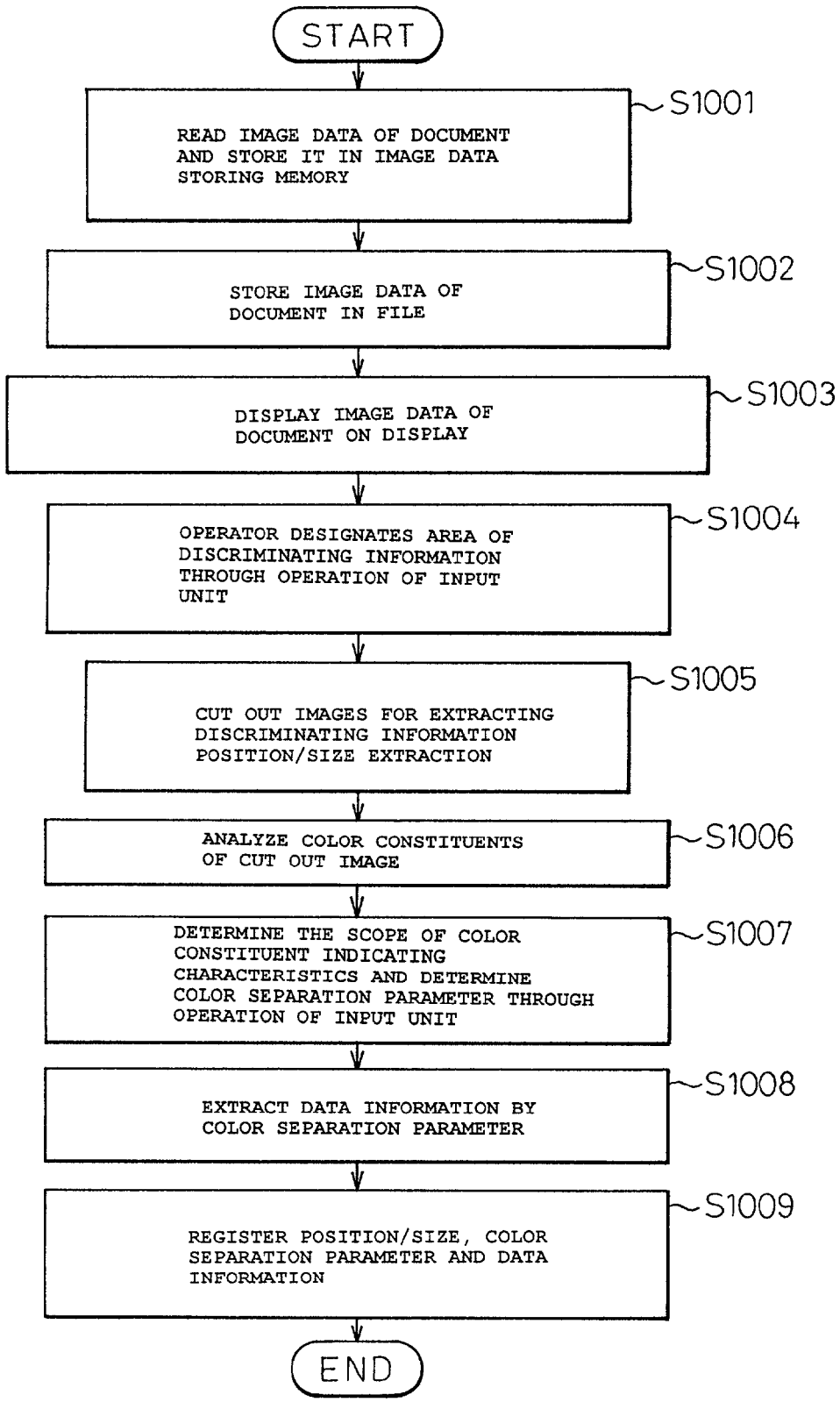
FIG. 10 is a flowchart for explaining the operation of the embodiment of the present invention when attention is paid to the activation of the registration step of the document discriminating apparatus.

The operation of the document discriminating apparatus in the registration step will be described below with reference to FIG. 10 showing a flowchart which explains operations at the time of activation of the registration step and FIG. 3.

Namely, as shown in FIG. 3, when image data of a document 106 (for example, an electric rate bill) is read at the image data reader 101 through the operation by the operator (step S1001), the image data so read is temporarily stored in the image data storing memory 202, and this image data is also stored in the hard disk 103, whereby the whole image data read at the image data reader 101 is stored (step S1002).

Note that the image data read at the image data reader 101 is indicated via the display 104, as shown in FIG. 3 (step s1003).

Here, in a case where the image data stored in the image data storing memory 202 and the hard disk 103 is the first image data that has ever been read related to a document, the document discriminating information is stored in the document discriminating dictionary unit 204 as will be described below.

Namely, while referring to the display 104, the operator operates the input unit 105 for designation of areas of unique information to be extracted relative to the image cutting out unit 203 (step S1004). For example, as shown in FIG. 3, the 'ELECTRIC RATE', which is the first document discriminating information, is designated by surrounding it with a frame.

Then, since the position $(X_0, Y_0)$ and size of the document discriminating information can be specified when the document discriminating information is designated, the image cutting out unit 203 automatically cuts out image data for extraction which corresponds to the unique information described on the document from the image data storing memory 202 (step S1005).

Next, the cut out image data for extraction is sent to the color constituent extracting unit 213, where color information is analyzed from the cut out image data, and a density distribution related to each color constituent shown in FIG. 8 is prepared following the aforesaid color constituent extraction principle, and the distributed state is then displayed on the display 104 (step S1006). The operator can designate display conditions through the input unit 105'.

Then, the operator looks at the density distributions of the respective color constituents shown on the display 104 and selects a characteristic color constituent from the respective color constituents. The operator then designates the color constituent and a boundary a related to the color constituent relative to the color constituent extracting unit 213 by operating the input unit 105'. The color constituent extracting unit 213 receives the designation and determines a color separation parameter (step S1007).

The determined color separation parameter is then sent to the color constituent separating unit 214. Here, the color constituent separating unit 214 extracts data information from the cut out image data following the color separation parameter (step S1008).

Next, the position information, size information, color separation parameter and the data information related to the discriminating information which are prepared as described above are registered in the document discriminating information column of the corresponding document in the document discriminating dictionary unit 204 (step S1009).

In addition, when designating a plurality of extraction objects, the operations from step S1004 to step S1009 are repeated for each extraction object to obtain discriminating information. The discriminating information so obtained for the plurality of extraction objects is registered for each document discriminating information of the corresponding document in the document discriminating dictionary unit 204.

Referring to the aforesaid FIG. 3, for example, the electric rate indicating the details of the amount of money to be paid which is described on the bill is designated as first unique information by the operation of the input unit 105 by the operator, and 'FUJI ICHIRO' indicating the designation of a payer of the bill is designated as second unique information. Then, at the image data cutting out unit 203, the position information, size information, color separation parameter and data information in the first unique information are stored, and the position information, size information, color separation parameter and data information in the second unique information are extracted and stored in an area 204*a* of the document discriminating dictionary unit 204.

Thus, respective information related to a plurality of pieces of unique information is also extracted for a document B, and document discriminating information obtained is then stored in an area 204*b* of the document discriminating dictionary unit 204 as document discriminating information of the document type B having an ID number '0102' affixed thereto.

Note that in this document discriminating apparatus the image data cut out at the image data cutting out unit 203 is used only for discrimination of the document.

[Operation in Document Discriminating Step]

Figure 6:
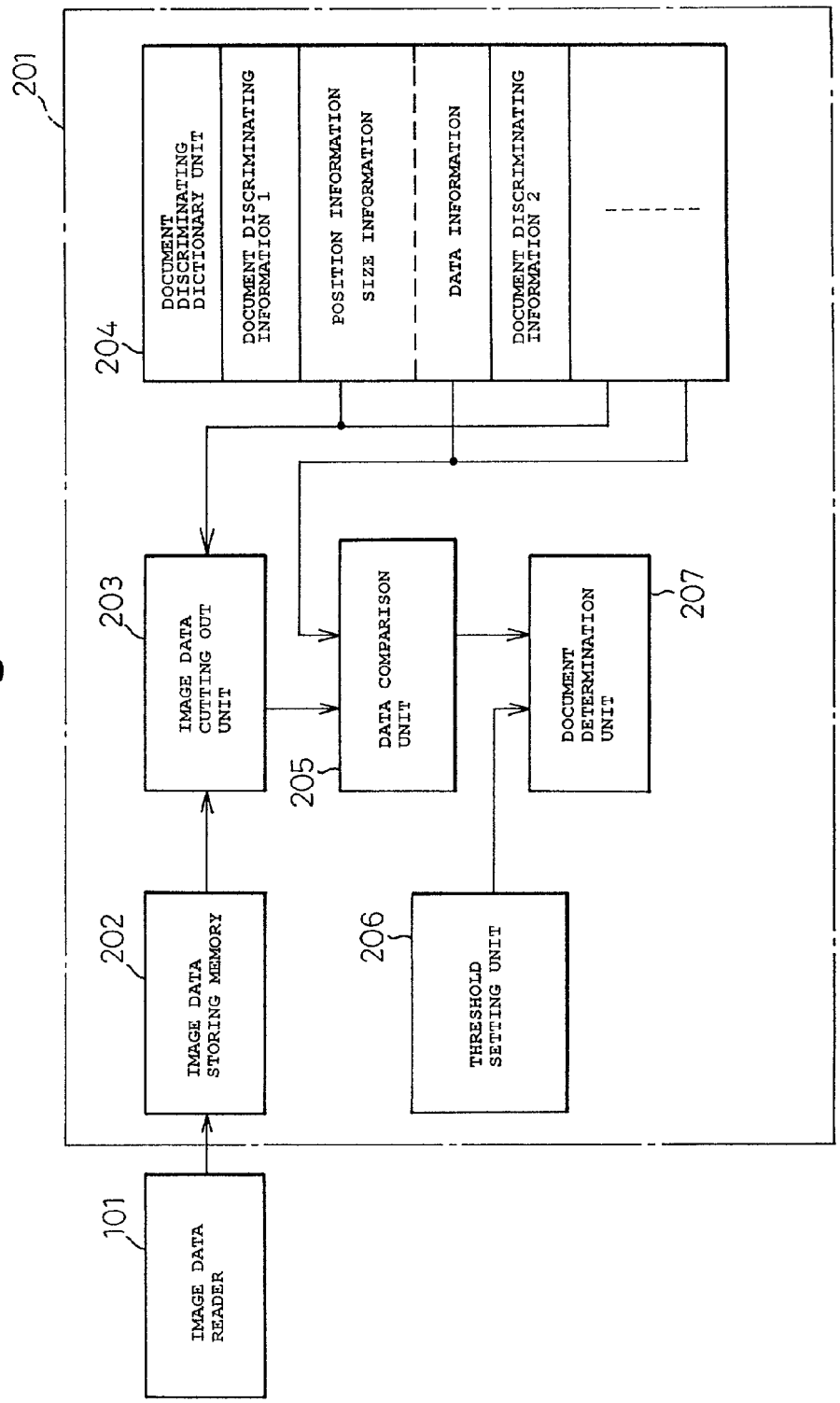
FIG. 6 is a control block diagram of the document discriminating apparatus according to the present invention when attention is paid to the activation of a document determination step.
Figure 7:
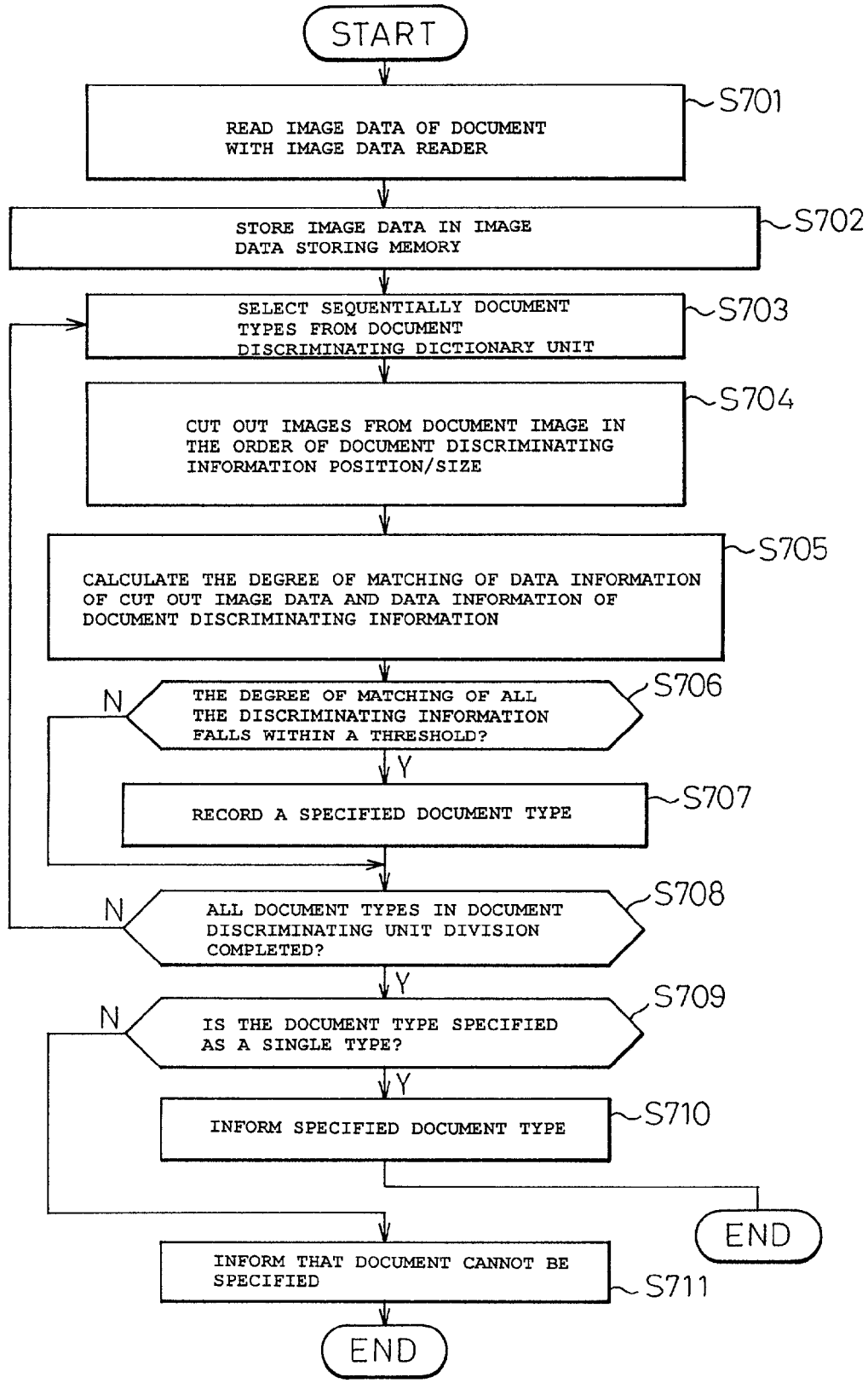
FIG. 7 is a flowchart for explaining the operation of the document discriminating apparatus which constitutes the base of the present invention when attention is paid to the activation of the document determination step.
Figure 11:
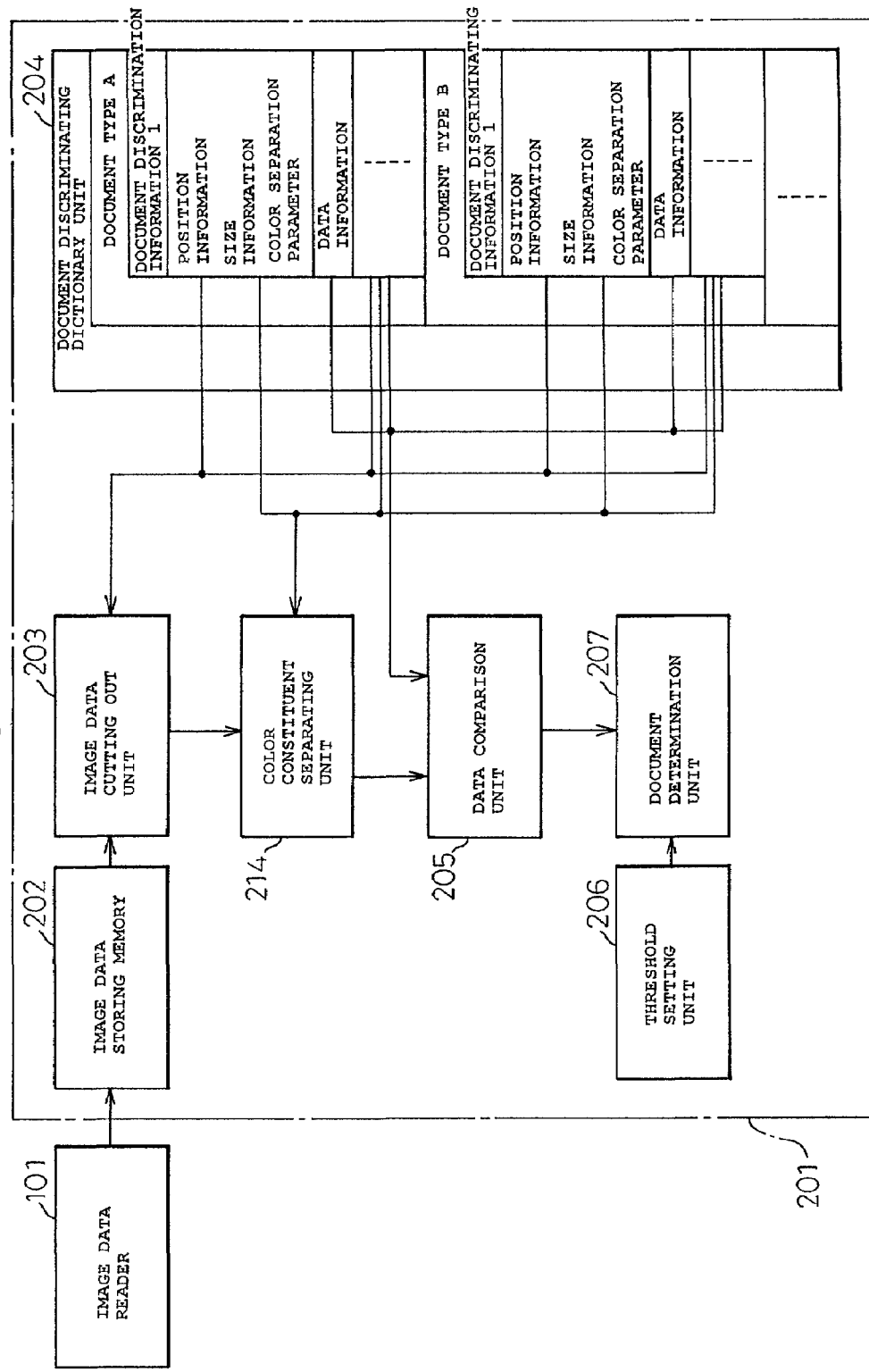
FIG. 11 is a control diagram of another embodiment of the present invention when attention is paid to the activation of a document discriminating step of a document discriminating apparatus.

Similar to the control block diagram shown in FIG. 6, FIG. 11 shows a control block diagram when attention is paid to the activation of the document discriminating step.

The control block shown in FIG. 11 comprises an image storing memory 202, an image data cutting out unit 203, a document discriminating dictionary unit 204, a data comparison unit 205, a threshold setting unit 206 and a document determination unit 207, and the control block of FIG. 11 is similar to that of FIG. 6 in that the image storing memory 202 is designed to store data from the image reader 101 which is obtained when a document is read with the image reader 101. However, the control block shown in FIG. 11 is characterized in that a color constituent separating unit 214 is added to the document discriminating apparatus according to this embodiment.

While the color constituent extracting unit 213 is included in the construction of the control block shown in FIG. 9 which is used when the registration step is activated, the color constituent extracting unit 213 is not included in the construction of the control block shown in FIG. 11 since the discriminating information does not have to be registered in the latter control block.

The operation of the document discriminating apparatus according to the embodiment of the present invention when the document discriminating step is activated will be described below using a flowchart for explaining the operation thereof when the document discriminating step is activated.

As has been described previously, in the verification step, whether or not the images of all the documents stored in the hard disk 103 can be specified using the document discriminating information registered in the document discriminating dictionary unit 204 is verified, and when the verification is completed, at the time of actual document discrimination, an operation which will be described below as a discriminating step for specifying the type of a document is performed.

Firstly, the image data of a certain document is read when the operator operates the image data reader 101. The image data so read is then temporarily stored in the image data storing memory 202 (step S1201).

Next, the image data cutting out unit 203 sequentially selects and reads out document discriminating information for each document sequentially in the order of the types of documents stored from the document discriminating dictionary unit 204 (step S1202).

Following this, the relevant data is cut out from the image data temporarily stored in the image data storing memory 202, based on the position information and size information which constitute the document discriminating information to be extracted in the first document type (step S1203).

Then, the color constituent separating unit 214 reads out a color separation parameter from the document discriminating information of the first document type in the document discriminating dictionary unit 204, and this color separation parameter is applied to the data cut out in step S1203. Here, the color constituent designated for this cut out image data is separated, and data information is extracted following the aforesaid extraction principle (step S1204).

The data information prepared in step S1204 is sent to the data comparison unit 205, where the extracted data information is compared with the data information read out from the document discriminating information of the first document type, and the degree of matching with the data information is calculated (step S1205).

Here, the calculation of the degree of matching for one piece of document discriminating information in the first document type is completed. Next, the degree of matching is sequentially calculated for a plurality of pieces of document discriminating information, and such a calculation is performed for all the document discriminating information. Then, the degree of matching of all the discriminating information is compared with the degree of matching set at the threshold setting unit 206, and whether or not the degree of matching of all the discriminating information meets the judgment criteria is determined (step S1206).

In case the degree of matching of all the discriminating information meets the judgment criteria (Y), it means that the document read with the image reader 101 is specified as the first document type that has ever been read, and as this occurs, the specified document type is then recorded in a memory, not shown, within the control unit 201 as the result of the specification. On the contrary, the degree of matching of all the discriminating information does not meet the judgment criteria (N), since it means that no specification is implemented, no record is made in step S1207.

Thus, while the discriminating operation from the first document type stored in the document discriminating dictionary unit 204 is completed, such discriminating operations from all the document types stored in the document discriminating dictionary unit 204 are to be executed (step S1208).

Here, in case the discriminating operation has not yet been completed with respect to all the document types stored in the document discriminating dictionary unit 204 (N), the operations from steps S1203 to S1208 are repeated until the discriminating operation has been completed with respect to all the document types stored in the document discriminating dictionary unit 204.

In case the discriminating operation has been completed with respect to all the documents (Y), whether or not the document type recorded in step S1207 exists is determined (step S1209). In case there are recorded one or more document types (Y), if there is one, the document type thereof, and if there are recorded a plurality of document types, then the document type which is closest is informed the operator of or displayed on the display 104 (step S1210).

On the contrary, in case there is recorded no document type in step S1209, in other words, in case there is no specific document type in the step (N), that the document read with the image reader 101 cannot specify the document type is informed or displayed.

Thus, when the discrimination of the document read with the image data reader 101 is completed, the following document needed to be discriminated is read with the image data reader 101, and the discriminating operations are repeated.

Effectiveness of the Invention

As has been described heretofore, the document discriminating apparatus according to the present invention comprises the image data reader 101, the image data storing memory 202, the hard disk 103, the image data cutting out unit 203, the document discriminating dictionary unit 204, the data comparison unit 205 and the document determination unit 207, and furthermore, the color constituent extracting unit and the color constituent separating unit are additionally provided. Then, the color constituents of the data cut out as the document discriminating information from the image data read from the document are separated and the color constituent indicating the characteristics is designated from the density distributions of the respective color constituents, so that the color separation parameter can be set.

The color information can be replaced with monochromatic information which can easily compare and discriminate color information by the fact that the color separation parameter can be set. Thus, thin spots in color at the area to be extracted and variation in tone between documents at the time of printing and reading can be properly dealt with, and furthermore, the influence of the background color can be eliminated. Owing to this, the accuracy of the document discriminating information can further be improved.

In discriminating documents, the type of a document whose image data is read with the image data reader 101 can automatically be discriminated, and the accuracy of the data cut out from the image data can be improved by the color separation parameter based on the color constituent extraction. Even if there exist a plurality of types of documents to be read at the image reader 101, the operator can process the documents without paying attention to the definition of each document, whereby the efficiency of the processing job can be improved. In addition, there is no need to describe an ID number for discriminating the document itself, whereby general types of documents can be used, thus the document discriminating apparatus of the present invention being able to be applied to existing systems with ease.

Additionally, in registering the document discriminating information into the document discriminating dictionary unit 204, as the required document discriminating information can automatically be taken in when the operator so designates while looking at the image data of the document to be registered which is shown on the display 104, the dictionary for discriminating documents can easily be prepared, thereby making it possible to attempt to increase the efficiency of the document processing job.

Furthermore, as the document discriminating information that is extracted through the designation of the discriminating information by the operator can be designated at the plurality of locations of the document, the document can be specified with higher accuracy when compared with the document discriminating information which is designated at the single location.

What is claimed is:

1. An apparatus for discriminating a document with a discriminating information, said apparatus comprising:

image reading unit reading image data from said document prepared in an optional format;

image data cutting out unit cutting out image data corresponding to a designated specified portion of said document from said image data read by said image reading unit;

color constituent extracting unit analyzing color constituents of said image data cut out by said cutting out unit and setting a color separation parameter determining a density distribution scope in color space for a specific color constituent of said image data cut out, and storing said color separation parameter together with the discriminating information in a document discriminating dictionary unit;

color constituent separating unit producing said discriminating information based on said color separation parameter set by said color constituent extracting unit; and a document determination unit comparing for determination said discriminating information produced from image data obtained by reading a document to be discriminated based on said color separation parameter with said discriminating information stored in said document discriminating dictionary unit.

2. A method for discriminating a document prepared in an optional format based on image data read from said document, said method comprising the steps of:

cutting out image data corresponding to a designated specified portion of said document;

analyzing color constituents of said image data so cut out, selecting a specific color constituent and setting a color separation parameter determining a density distribution scope in color space for the selected color constituent, and storing said color separation parameter together with said discriminating information in a document discriminating dictionary unit; and producing a discriminating information for said specified portion from said cut out image data based on said color separation parameter; wherein discriminating information is prepared from image data obtained by reading a document to be discriminated based on said color separation parameter, and wherein said discriminating information so prepared is compared for determination with said discriminating information stored in said document discriminating dictionary unit.

3. A method for discriminating a document as set forth in claim 2, wherein said color constituent is analyzed with three primary colors of color, one of said three primary colors is selected as said specific color constituent, and said color separation parameter is determined based on density distributions of said three primary colors.

* * * * *